(12) United States Patent
L'Heureux et al.

(10) Patent No.: US 8,738,446 B1
(45) Date of Patent: May 27, 2014

(54) NETWORK-BASED ADVERTISING SYSTEM AND METHOD

(76) Inventors: Israel L'Heureux, Monaco (MC); Mark D. Alleman, Portland, OR (US)

( * ) Notice: Subject to any disclaimer, the term of this patent is extended or adjusted under 35 U.S.C. 154(b) by 774 days.

(21) Appl. No.: 12/915,511

(22) Filed: Oct. 29, 2010

(51) Int. Cl.
*G06Q 30/00* (2012.01)

(52) U.S. Cl.
USPC ............... 705/14.72; 705/14.54; 705/14.73

(58) Field of Classification Search
USPC ................... 705/14.72, 14.54, 14.73
See application file for complete search history.

(56) References Cited

U.S. PATENT DOCUMENTS

| | | | |
|---|---|---|---|
| 2008/0270228 A1* | 10/2008 | Dasdan | 705/14 |
| 2009/0006213 A1* | 1/2009 | Lerman et al. | 705/14 |
| 2010/0082411 A1* | 4/2010 | Goyal et al. | 705/14.4 |
| 2010/0082441 A1* | 4/2010 | Doemling et al. | 705/14.72 |
| 2011/0125576 A1* | 5/2011 | Song et al. | 705/14.53 |
| 2011/0196749 A1* | 8/2011 | Herlein et al. | 705/14.72 |
| 2011/0208579 A1* | 8/2011 | Krishnamoorthy | 705/14.45 |

FOREIGN PATENT DOCUMENTS

WO   WO 2010016892 A1 *   2/2010

OTHER PUBLICATIONS

Google New Local Ad Category Invades the "7 Pack", Feb. 1, 2010.

* cited by examiner

*Primary Examiner* — Michael Bekerman
(74) *Attorney, Agent, or Firm* — Michael J. Andri

(57) ABSTRACT

Network-based advertising systems and methods for providing dynamic advertising information are provided. The system may include an advertising campaign management server configured, in an advertising campaign input phase, to serve an advertising client graphical user interface via an advertiser client. The interface may include a static advertising data input tool configured to receive static advertising data including advertisement text and a static advertisement link. The interface may further include a dynamic advertising data input tool configured to receive a dynamic data link to dynamic advertising data stored in an advertiser data source. The advertising campaign management server is configured to store the static advertising data and the dynamic data link in an associated advertisement data store for later retrieval by an advertising delivery server during an advertising delivery phase.

15 Claims, 4 Drawing Sheets

NETWORK-BASED ADVERTISING SYSTEM AND METHOD

BACKGROUND

The network-based advertising systems and methods described herein are related generally to delivering advertising to users of the Internet. One type of prior advertisement delivery system looks for keywords in a user's search engine query, and displays advertisements to the user that are matched to the keywords identified. Thus, a search for "skis" may result in advertisements for skis being displayed. In addition, prior advertising systems index the textual content of websites and then display advertisements are associated with keywords that are included in the content of the website, when the website is visited by a user. In this manner, an advertisement for a sporting publication may be displayed upon a user accessing a sporting goods website.

However, these prior online advertising systems suffer from low click-through rates and low return on investment for advertisers because users are inundated with advertisements and do not perceive the ads to be of sufficient value to click on them. One source of this problem is that currently, advertisements delivered by search engines offer only a few lines of static text and a hyperlink. Low click-thru rates suggest that users frequently ignore such advertisements. Worse, users may perceive such advertisements in a negative manner, as "clutter" in the user's web browsing experience. This results in ineffective advertising for the advertiser and frustration for the user.

SUMMARY

Network-based advertising systems and methods for providing dynamic advertising information are provided. The system may include an advertising campaign management server configured, in an advertising campaign input phase, to serve an advertising client graphical user interface via an advertiser client. The interface may include a static advertising data input tool configured to receive static advertising data including advertisement text and a static advertisement link. The interface may further include a dynamic advertising data input tool configured to receive a dynamic data link to dynamic advertising data stored in an advertiser data source. The advertising campaign management server is configured to store the static advertising data and the dynamic data link in an associated advertisement data store for later retrieval by an advertising delivery server during an advertising delivery phase.

This summary provides a general overview of one aspect of the disclosed embodiments. Other aspects of the embodiments are described in detail below.

DETAILED DESCRIPTION

Network-based advertising systems and methods are provided which allow the presentation of dynamic advertising information to a user of a computer network, such as the Internet. An advertiser may access an interface for a network-based advertising system using an advertising client and input advertising campaign parameters for an advertising campaign, including static and dynamic advertising data such as hyperlinks, price data, geographic location, descriptive text, uniform resource locator (URL), demographic data, one or more dynamic data links to an advertiser data source, and so on. The advertising campaign is then stored in an advertisement data store.

The static and dynamic advertising data may be displayed, via a search graphical user interface (GUI), in response to user searches containing keywords or other information related to the advertising campaign. The user client displaying the search GUI will download the advertising data from an advertising delivery server, which includes both static advertising data and a dynamic data link to dynamic advertising data on the advertiser data source. The user client then downloads dynamic advertising data via the dynamic data link, and displays it in the advertisement in the search GUI. In this way, various data that are updated periodically (e.g., dynamic data such as pricing and inventory information), may be pulled from the advertiser's systems and displayed to the user of the search GUI, making the advertisements based on this data more relevant and timely to a viewing consumer.

Figure 1:
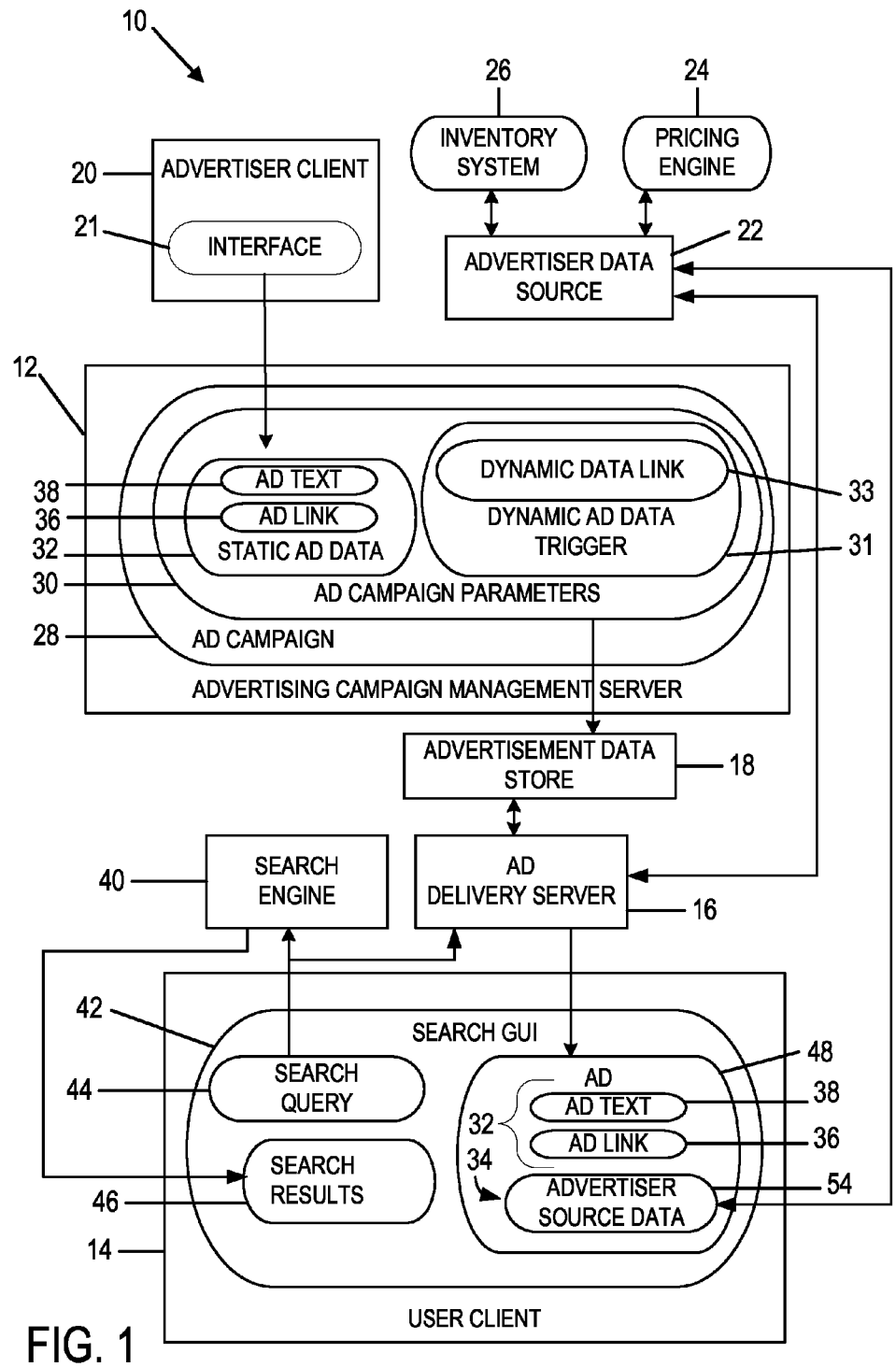
FIG. 1 is a schematic drawing of an embodiment of network-based advertising system according to the present disclosure.

FIG. 1 shows a network-based advertising system 10 including an advertising campaign management server 12 in communication with a user client 14 via a computer network such as the Internet. The advertising campaign management server 12 is a tool by which advertisers may create and manage advertising campaigns. The advertising campaign management server 12 may also be in communication with an advertising delivery server 16 and an advertisement data store 18 via various computer networks.

The advertising campaign management server 12 may store data regarding advertising campaigns 28 in the advertisement data store 18. Advertising delivery server 16 may serve the advertisement according to the advertising campaign parameters 30 to a user client 14. Typically, the advertising campaign management server 12 is not in direct communication with the user client 14, though it may exchange information with the user client 14 via advertising delivery server 16, as shown in FIG. 1. While the advertising campaign management server 12, advertisement data store 18, and advertising delivery server 16 are shown as separate computing devices in FIG. 1, it will be appreciated that in other embodiments the functions of these devices may be integrated into a single server, or may be distributed across multiple servers in a virtual machine environment, for example.

Figure 4:
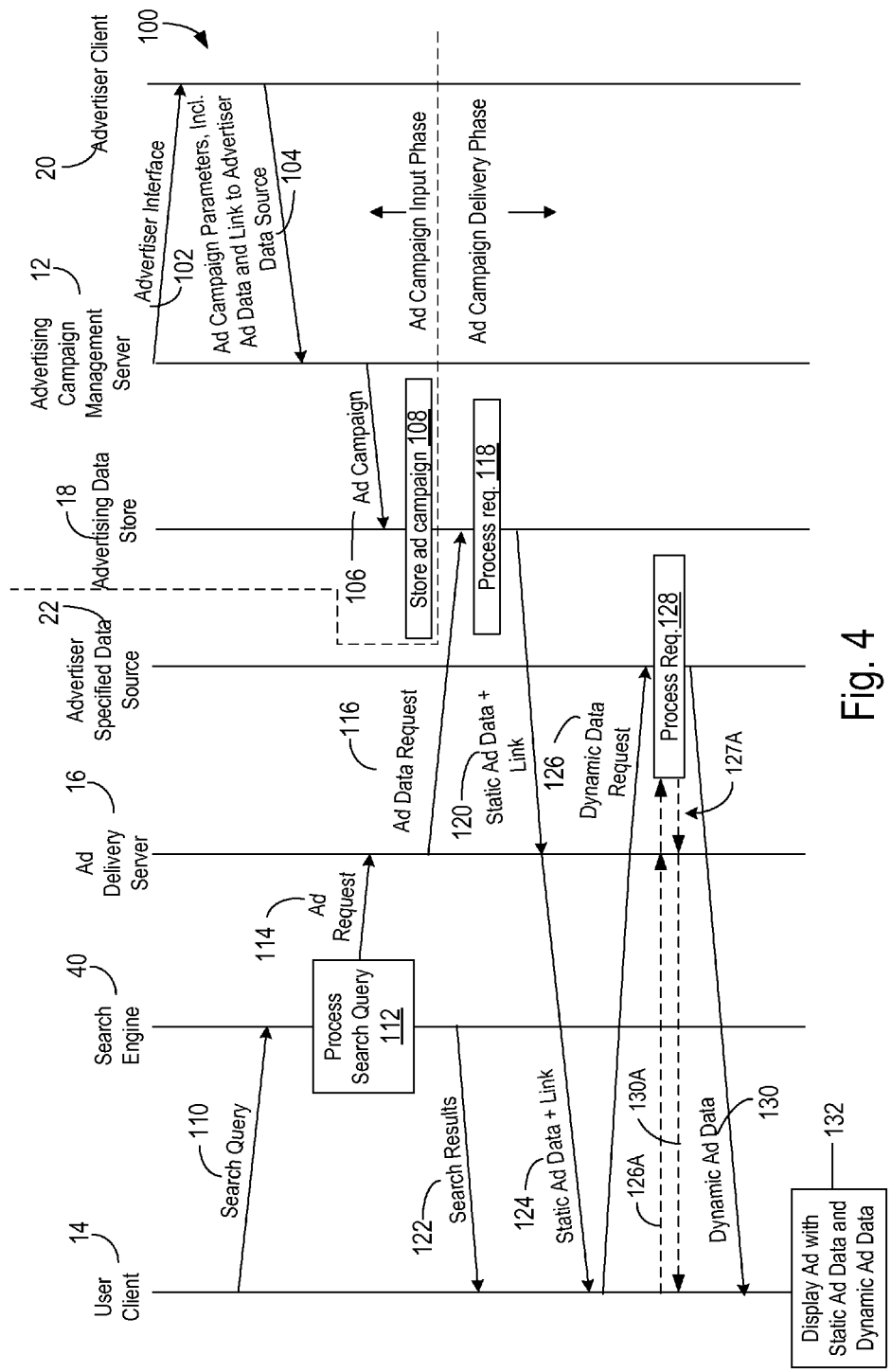
FIG. 4 is a communications flow diagram of the system of FIG. 1, which illustrates a method for network-based advertising according to an embodiment of the present invention.

Campaign management server 12 typically includes an advertising client graphical user interface, such as client interface 21, which may be a web-based interface, and which is configured to enable the advertiser to access the advertising campaign management server 12 and create and manage advertising campaigns. One example of a client interface 21 is illustrated in FIG. 4, described in detail below. The advertiser may access the client interface 21 and input, among other information, a network addressable location for an advertiser data source 22, for example by inputting a dynamic advertising data trigger 31, such as a dynamic data link 33 (i.e., uniform resource identifier URI). The advertiser data source may draw from various advertiser-side data software systems, such as an inventory system 26 and a pricing engine 24, which are respectively executed on one or more advertiser computing devices.

The advertising campaign management server 12 may operate in an advertising campaign input phase, where it is configured to serve the client interface 21 via an advertiser client 20. The client interface 21 may be implemented as a web interface accessible via a web browser program. Alternatively, the client interface 21 may be a stand-alone program, a browser toolbar plug-in, etc.

The advertising campaign management server 12 may be utilized by an advertiser via advertiser client 20 and client interface 21 to formulate an advertising campaign 28 whose advertising campaign parameters 30 are stored in the advertising campaign management server 12. The advertising campaign parameters 30 may include both static advertising data 32 and a dynamic advertising data trigger 31, such as a dynamic data link 33 to an advertiser data source 22, which will allow the presentation of dynamic advertising data 34 (see FIGS. 2 and 3) based on information stored by the advertiser data source 22.

The client interface 21 of the advertising campaign management server 12 may include one or more data selectors by which advertising campaign parameters 30 may be input. Examples of such data selectors are illustrated in FIG. 4, described below. As one example, a data selector may be provided that is configured to enable an advertiser to input a network addressable location of the dynamic advertising data 34, for example on a web page, and configured to generate a dynamic data link 33 to the dynamic advertising data 34 at the network addressable location. For example, the dynamic data link may be a uniform resource indicator (URI) or uniform resource locator (URL) that points to specific data within the web page. Alternatively, the data selector may enable the advertiser to input a dynamic data link 33 to a location in a database at which the dynamic advertising data 34 is stored. Such a dynamic data link, it will be appreciated, will cause a client request to be made to a database server for return of the requested dynamic advertising data. The dynamic advertising data 34 may include such items as inventory data, pricing data, model data, retail location data, or current image data, and may be organized according to preexisting schema for each data type.

The advertiser client 20 may also allow an advertiser to input static advertising data 32 as part of its advertisement campaign parameters 30. Such static advertising data 32 may include a static advertisement link 36, such as a URL that designates the address of the advertiser's website. The static advertising data 32 may also include advertisement text 38, such an advertisement message, descriptive text identifying the advertiser, etc. The advertiser client 20 may further be configured to receive pricing information indicating a price that the advertiser is willing to pay for display of the ad data. Finally, the advertiser client 20 may be configured to receive advertiser-inputted keywords associated with the advertising campaign, or other characteristics with which the advertiser would like its ads related.

Figure 3:
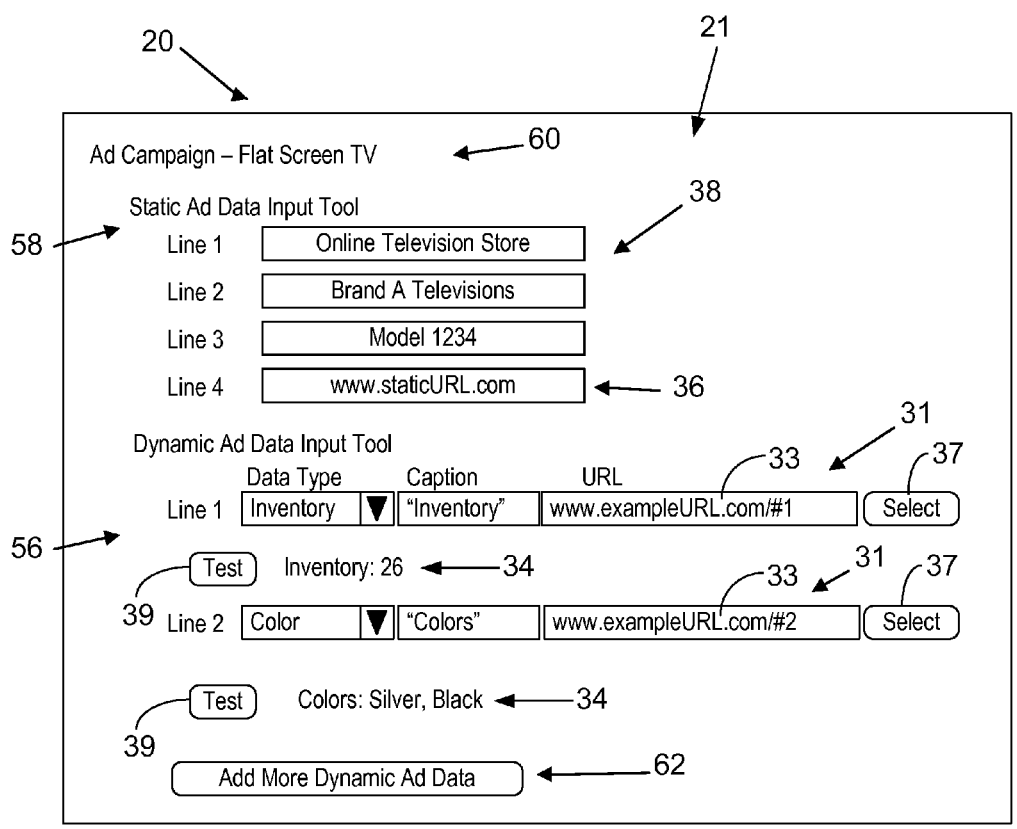
FIG. 3 is a schematic drawing of an embodiment of an advertising client graphical user interface of the system of FIG. 1.

As shown in FIG. 3, one example of the client interface 21 displayed on the advertiser client 20 is shown. Interface 21 is configured to allow an advertiser to input various advertising campaign parameters 30 for an advertising campaign 28. In this way, the elements of an advertising campaign may be modified through use of an static advertising data input tool 58 configured to receive information such as lines 1-3 of advertisement text 38 and a static advertisement link 36. The elements of an advertisement may also be modified through use of an advertiser data source input tool 56 configured to receive a dynamic data link 33 to dynamic advertising data 34 stored in an advertiser data source 22.

Returning to FIG. 1, once the advertising campaign parameters 30 have been input by the advertiser via the interface 21, the advertisement campaign parameters 30, including the static advertising data 32, and the dynamic data link 33 to the dynamic advertising data 34 in the advertiser data source 22, are stored in an associated advertisement data store 18.

During an ad delivery phase, which may be an advertiser specified campaign period in which the advertising campaign is active, advertising delivery server 16 is configured to serve ads of the advertising campaign to requesting user clients. The advertising delivery server 16 is configured to receive a request from a user client 14 for an advertisement and in response send the static advertising data 32 and a dynamic data link 33 to the dynamic advertising data 34 for display on the user client 14. The advertising delivery server 16 may retrieve the advertisement campaign parameters 30 containing the static advertising data 32 and the dynamic data link 33 from the advertisement data store 18. As described above, in one embodiment, the static advertising data 32 and dynamic data link 33 are transmitted from the advertising delivery server 16 to the user client 14, and the user client 14 is configured to render the static advertising data 32, and retrieve the dynamic advertising data 34 from the advertiser data source 22 via the dynamic data link 33, and render the dynamic advertising data 34.

Alternatively, the advertising delivery server 16 may be configured to retrieve the dynamic advertising data 34 from the advertising data source 22, for example, upon receiving the request for the advertisement from the user client 14, or at some other predetermined interval. Further, it will be appreciated that the advertising delivery server 16 may cache the dynamic advertising data 34 in the advertisement data store, and thus may upon receiving the request from the user client retrieve a cached copy of the dynamic advertising data 34 from the advertisement data store. To prevent dynamic advertising data from becoming stale, the advertising delivery server 16 may check an expiration date of the cached dynamic advertising data, before transmitting said data to the user client 14.

As shown in FIG. 1, the network-based advertising system 10 will typically include an associated search engine 40. The search engine 40 is typically configured to serve a search GUI 42 to a user of the Internet operating a user client 14. The user will input a search query 44 in the search GUI 42, which in turn will forward the query to the search engine 40. The search engine 40 is configured to process the search query 44 and respond to the search GUI with search results 46. Concurrently, the search engine 40 is configured to receive the search query 44 and forward it to the advertising delivery server 16 so that the advertising delivery server 16 can select one or more advertisements to be served to the user client 14, based on the search query 44.

In response to receipt of the search query 44 from the search engine 40, the advertising delivery server 16 may be configured to select one or more advertisements 48 that match keywords, geographical coordinates, or other parameters included in the search query. Thus, it will be appreciated that advertisement campaign parameters 30 also include advertiser-inputted keywords that are used to match the advertising campaign with the search query 44. One or more selected advertisements 48 may be transmitted to the user client 14 directly from the advertising delivery server 16, as is illustrated, or in some alternative embodiments may be returned to the search engine 40 for forwarding to the user client 14.

The advertisements 48 displayed on the search GUI 42 of the user client 14 may include a number of elements. For example, the advertisements 48 may include static advertising data 32 such as advertisement text 38 and a static advertisement link 36, as well as dynamic advertising data 34 such as advertiser source data 54. Static advertising data 32 and dynamic advertising data trigger 31 (e.g., dynamic data link 33) are typically downloaded from the advertising delivery server to the user client 14 in a markup language format, such as HTML, and rendered by the user client 14 to be displayed to the user. It will be appreciated that static advertisement link 36 is rendered so as to be a hyperlink selectable by the user, while dynamic data link 33 is downloaded as a pointer to external data. During the rendering process, the user client 14 does not display dynamic data link 33, but rather traverses dynamic data link 33 to download the advertiser source data 54 from the network addressable location on advertiser data source 22 that is identified in the dynamic data link 33. In turn, advertiser source data 54 is rendered and displayed on user client 14.

Figure 2:
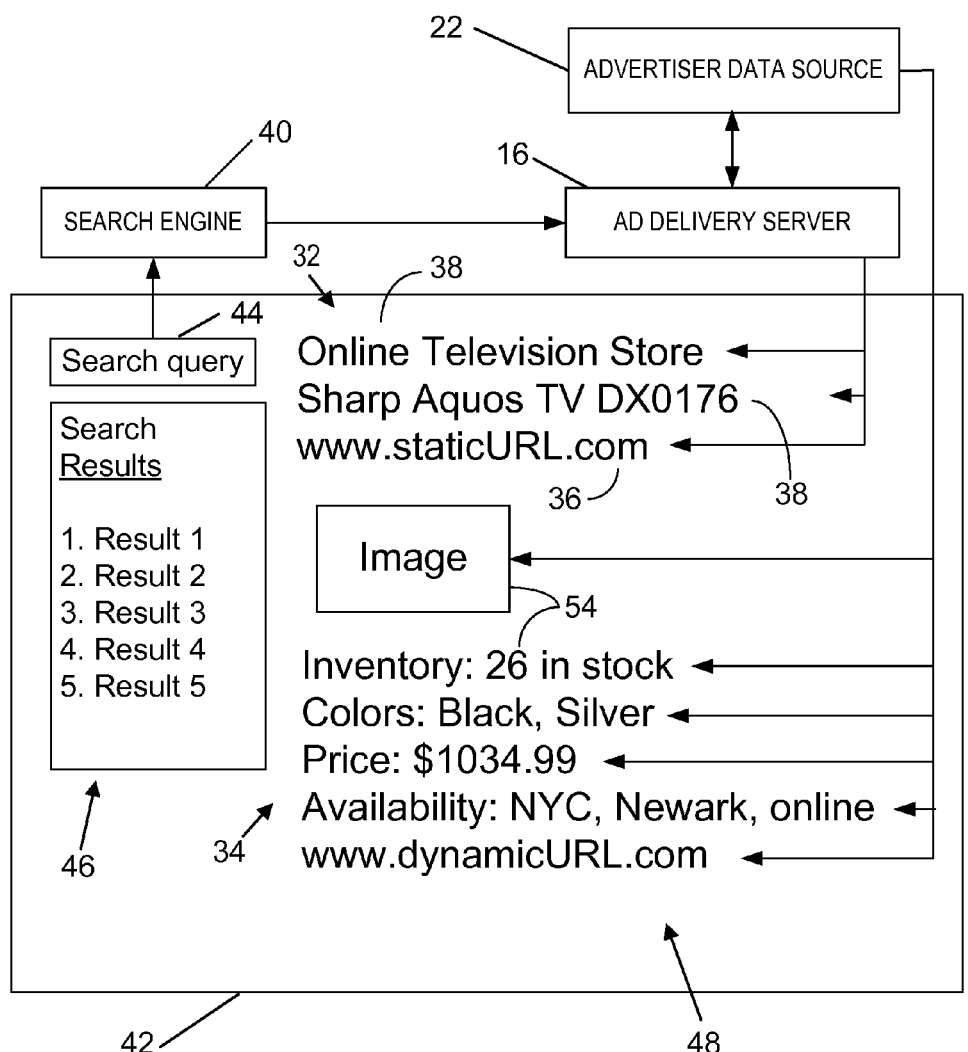
FIG. 2 is a schematic drawing of an embodiment of a search graphical user interface of the system of FIG. 1.

FIG. 2 is a schematic example of the appearance of a search GUI 42 on a user client 14 after a user of the Internet inputs a search query 44 for the search engine 40 to process, and after the user receives his or her search results. As described above, the search GUI 42 may display a set of search results 46 returned to the user in response to the search query, and one or more advertisements 48 related to the subject matter of the search query. In the illustrated example, static advertising data 32 is displayed, which has been downloaded from the advertising delivery server 16. The static advertising data 32 includes two lines of advertisement text 38 and a static advertisement link 36. Further, dynamic advertising data 34 is displayed, which has been downloaded from the advertiser data source 22. The advertiser data source 22, as described above, may be a data source at a network addressable location, such as an indexed (by search engines) or non-indexed web page. The dynamic advertising data 34 includes advertiser source data 54 such as an image, inventory parameters, colors, price, availability data, and a dynamic URL. It will be appreciated that because this data is dynamic, as the advertiser updates the advertiser source data 54 on the advertiser data source, such as by updating a non-indexed web page of price or inventory information, for example, advertisements 48 that are served after the update will contain the updated information. In this manner, advertisers may simply and effectively communicate dynamic information in a timely manner to consumers via advertisements 48, which helps inform purchasing decisions.

FIG. 3 shows an embodiment of advertiser client interface 21 displayed on advertiser client 20 for editing of advertising campaign parameters 30. The advertiser client interface 21 includes a dynamic advertising data input tool 56 and a static advertising data input tool 58. The dynamic advertising data input tool 56 may include a number of entry locations for identifying the advertiser data source 22 at which dynamic advertising data 34 is stored. The illustrated example shows, for each of line 1 and 2 of a dynamic advertising data field, pull down menus for data type, a text field in which a text caption may be entered, and a URL field in which a URL may be entered.

Further, a select button 37 is provided for each element of dynamic data, which upon actuation is configured to display a browsing tool to enable an advertiser to browse to and specify a network addressable location at which the dynamic advertising data is stored on the advertiser data source. Using the select button a user may browse, for example in a pop-up window, to a desired URL and select the specific portion of the web page being displayed at the URL at which the dynamic advertising data 34 is stored. In this manner a dynamic advertising data trigger 31 may be inputted, which includes the dynamic data link 33 as well as structured data such as data type and descriptive caption indicating the nature of the dynamic data 34.

A test button 39 for each element of dynamic data may be provided which upon actuation is configured to test the dynamic data link to the dynamic advertising data inputted by the advertiser, by retrieving the dynamic advertising data from the advertising data source and displaying the retrieved dynamic advertising data via the advertising interface. Actuation of the test button causes the dynamic advertising data input tool to retrieve the data from the indicated URL and display it on the interface 21, as shown at "Inventory: 26", and "Colors: Silver, Black". Thus, the current inventory is 26 and the current available colors are silver and black according to the dynamic advertising data 34 stored at locations identified in the URLs input via the dynamic advertising data input tool 56. In this manner, an advertiser can verify that the advertising data source is properly serving the data, and dynamic advertising data input tool 56 is properly creating the dynamic data link 33.

Likewise, static advertising data input tool 58 may include a number of entry locations for inputting static advertising data 32, such as a static advertisement link 36 and advertisement text 38. The advertiser client 20 of the illustrated embodiment typically includes text 60 identifying the advertising campaign being edited, as well as an option button 62 allowing a user to add or remove data fields.

Having described the components of an illustrated embodiment of a network-based advertising system 10, there follows a description of how the system may be used.

FIG. 4 illustrates a method 100 for providing dynamic advertising data over a network. Method 100 may be performed using the hardware and software components of system 10 described above, or other suitable hardware and software components. Method 100 may include, at 102, serving an advertising interface from an advertising campaign management server 12 to an advertiser client 20. The advertiser interface may take the form illustrated in FIG. 3, in one example. At 104, the method includes transmitting the advertising campaign parameters that have been inputted into the advertiser client, such as static advertising data and a dynamic data link to dynamic advertising data, to the advertising campaign management server. At 106, the method includes transmitting the advertising campaign parameters from the advertising campaign management server to the advertising data store. At 108, the method includes storing the advertising campaign parameters in an advertisement data store associated with the advertising campaign management server. It will be appreciated that steps 102-108 form an advertisement campaign input phase of the method 100.

Turning now to an advertisement campaign delivery phase of the method 100, at 110, the method may include receiving a search query inputted by a user, at a search engine. The search query may for example include one or more user-specified keywords or other search parameters such as geographic location, etc. As discussed above, at 112, the method may include processing the search query at the search engine, and, at 114, sending an advertisement request to an advertising delivery server associated search engine. The user-specified keywords may be sent from the search engine to the advertising delivery server in order to select an advertisement that matches the keywords. Thus, at 114, the method may additionally include receiving at the advertising delivery server one or more user-specified keywords of a search query from the search engine, the user-specified keywords being associated with the advertisement request. The processing may further include generating search results, and the method may further include at 122 transmitting the search result to the user client for rendering and display to a user.

At 116, the method may include sending an advertisement data request from the advertising delivery server to an advertising data store associated with the advertising delivery server. To make this request, the method may utilize the user-specified keywords as an aid in selecting a relevant advertisement. Thus, the method may include selecting an advertisement for delivery to the user client based on a detected match between the user client-specified keywords and one or more advertiser-specified keywords for the advertisement. These advertiser-specified keywords may be received during the advertising campaign input phase. For example, at 102, the method may further include receiving from the advertiser advertising campaign parameters including one or more advertiser-specified keywords.

At 118, the method may include processing the advertisement data request and at 120, transmitting advertisement data for an advertisement back to the advertising delivery server. At 124, the method may include transmitting to the user client the advertisement data from the advertising delivery server. It will be appreciated that the advertisement data transmitted at 120 and 124 includes static advertising data, including, e.g., advertisement text and a static advertisement link, and also may include a dynamic advertising data trigger, such as a dynamic data link to dynamic advertising data such as advertiser source data stored on an advertiser data source. The dynamic data link may be encoded so as to cause the user client to render the dynamic data link by retrieving advertiser source data from the advertiser data source and displaying the advertiser source data as the dynamic advertising data on a display associated with the user client.

The user client may traverse the dynamic data link to retrieve and display the dynamic advertising data in the advertisement. Thus, at 126, the method further includes sending from the user client, and receiving at the advertiser data source, a request for dynamic advertising data. At 128, the method includes processing the request for dynamic advertising data, and at 130 transmitting the requested dynamic advertising data back to the user client, for rendering and display. On the user client, the advertisement data received at 124 and the dynamic advertising data received at 130 are rendered for display to a user, and may be displayed adjacent search results, which were transmitted at 122 from the search engine to the user client.

In other embodiments, it will be appreciated that the advertisement data shown as received by the user client at 124 may be transmitted to the user client from the advertising delivery server and/or advertising data store via the search engine, or alternatively from the advertising data store directly to the user client. Further, it will be appreciated that the advertiser data store may be a separate server operated by the advertiser, or in some embodiments may be a specific location under the control of the advertising delivery server. Thus, as described above, the advertiser source data may be locally cached at the advertiser data store periodically by advertising delivery server. As illustrated at 126A in dashed lines, the request for dynamic advertising data may be sent from the user client to an advertiser data source that is specified on the advertising delivery server and/or advertising data store. The advertising data server may be configured to process the request received at 126A by determining whether it has dynamic advertising data locally cached that is not expired and if so, may reply to the user client by transmitting the dynamic advertising data to the user client, as illustrated at 130A. Or, if no unexpired dynamic advertising data is locally cached, the advertising delivery server may be configured to retrieve dynamic advertising data from the advertiser data source, as indicated in dashed lines at 127A. In this manner, the stability, scale, and bandwidth of the advertising delivery server may be leveraged by smaller advertisers whose own websites may experience temporary outages during peak traffic, for example, while still providing the flexibility of an advertising method that enables advertisers to specify advertising data source location for dynamic advertising data.

Finally, at 132, the method includes displaying the advertisement with the static advertising data received from the advertising delivery server and the dynamic advertising data received from the advertiser data source.

It will be appreciated that the user client, the advertiser client, advertising delivery server, advertisement data store, advertiser data source, search engine, and the advertising campaign management server are each computing devices with associated processors, memories, and mass storage, and are each configured to implement programs to achieve the functionality described herein. Although shown as separate devices, it will be appreciated that some of these devices may be combined into one machine, or distributed among several machines. For example, the advertising delivery server, advertisement data store, and advertising campaign management server may be executed on a single computing device in some embodiments, and in a distributed computing environment in other embodiments.

The above described systems and methods may be used by an advertiser to create advertising campaigns that communicate to consumers not only static data about a product or service, but also advertiser-specified dynamic data. In this manner, advertisements may communicate more useful and timely information to consumers in a manner that is simple to deploy for advertisers. This may potentially increase the utility of such advertisements to consumers, and likewise may increase the return on investment in such advertisements for advertisers.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A network-based advertising system, comprising:
an advertising campaign management server configured, in an advertising campaign input phase, to serve an advertising client graphical user interface via an advertiser client to enable an advertiser to input advertising campaign parameters for an advertising campaign, the interface including:
    a static advertising data input tool configured to receive static advertising data including advertisement text and a static advertisement link; and
    a dynamic advertising data input tool configured to receive a dynamic data link to dynamic advertising data stored in an advertiser data source, the dynamic advertising data including current inventory data;
    wherein the advertising campaign management server is configured to store the static advertising data and the dynamic data link in an associated advertisement data store, independent of the advertiser data source, for later retrieval by an advertising delivery server during an advertising delivery phase in which the static advertising data and the dynamic data link are sent by the advertising delivery server to a user client, and the dynamic advertising data is retrieved by the user client directly from the advertiser data source, independent of the advertisement data store, via the dynamic data link to enable the user client to render and display the dynamic advertising data including the current inventory data.

2. The system of claim 1, further comprising:
the advertising delivery server configured to receive a request for an advertisement and in response send the static advertising data and the dynamic data link to a user client for rendering and display.

3. The system of claim 1, wherein the dynamic advertising data input tool includes a select button which upon actuation is configured to display a browsing tool to enable the advertiser to browse to and specify a network addressable location at which the dynamic advertising data is stored on the advertiser data source.

4. The system of claim 1, wherein the dynamic advertising data input tool includes a test button which upon actuation is configured to test the link to the dynamic advertising data inputted by the advertiser, by retrieving the dynamic advertising data from the advertiser data source and displaying the dynamic advertising data via the advertiser interface.

5. The system of claim 1, wherein the advertiser client is implemented by a toolbar plug-in or web interface executed in a web browser program.

6. The system of claim 1, wherein the dynamic advertising data includes pricing data, model data, retail location data, or current image data in addition to the current inventory data.

7. The system of claim 1, wherein the advertiser client is further configured to receive advertiser-specified keywords associated with the advertising campaign, the system further comprising:
a search engine configured to receive a search query and forward one or more keywords of the search query to the advertising delivery server, and to receive from the advertising delivery server an advertisement with associated advertiser-specified keywords that match the keywords in the search query.

8. A network-based advertising method performed by one or more server devices including one or more associated processors implementing one or more associated programs, the method comprising the steps of:
in an advertising campaign input phase, receiving via an advertiser interface of a campaign management server of the one or more server devices, advertising campaign parameters including static advertising data and a dynamic data link to dynamic advertising data stored on an advertiser data source, and storing the advertising campaign parameters in an advertisement data store that is independent of the advertiser data source, the dynamic advertising data including current inventory data; and
in an advertising campaign delivery phase, at an advertising delivery server of the one or more server devices, receiving an advertisement request for an advertisement to be sent to a user client, and in response, the advertising delivery server retrieving the advertising campaign parameters from the advertisement data store and transmitting to the user client the static advertising data and the dynamic data link, the dynamic data link being encoded so as to cause the user client to retrieve the dynamic advertising data including the current inventory data directly from the advertiser data source, independent of the advertisement data source, and display the dynamic advertising data on a display associated with the user client.

9. The method of claim 8, further comprising the steps of:
during the advertising campaign input phase, receiving, from an advertiser, advertising campaign parameters including one or more advertiser-specified keywords; and
during the advertising campaign delivery phase,
receiving one or more user-specified keywords of a search query from a search engine, the user-specified keywords being associated with the advertisement request; and
selecting the advertisement for delivery to the user client based on a detected match between the user client-specified keywords and one or more of the advertiser-specified keywords for the advertisement.

10. The method of claim 9, wherein the search engine is configured to transmit search results for display on the user client; and
wherein the advertisement is displayed adjacent the search results.

11. The method of claim 9, further comprising the step of:
serving an advertiser interface from the advertising campaign management server, the advertiser interface including a static advertising data input tool configured to receive advertiser input for the static advertising data, and further including a dynamic advertising data input tool configured to receive advertiser input in the form of the dynamic data link to the dynamic advertising data on the advertiser data source.

12. The method of claim 11, wherein the dynamic advertising data input tool includes a select button which upon actuation is configured to display a browsing tool to enable an advertiser to browse to and specify a network addressable location at which the dynamic advertising data is stored on the advertiser data source.

13. The method of claim 11, wherein the dynamic advertising data input tool includes a test button which upon actuation is configured to test the dynamic data link to the dynamic advertising data inputted by the advertiser, by retrieving the dynamic advertising data from the advertising data source and displaying the dynamic advertising data via the advertising interface.

14. The method of claim 8, wherein the static data includes advertisement text and/or a static advertisement link.

15. The method of claim 8, wherein the dynamic advertising data includes one or more of pricing data, model data, retail location data, or current image data stored on the advertiser data source in addition to the current inventory data.

* * * * *